United States Patent [19]

Bearden

[11] Patent Number: 5,559,166
[45] Date of Patent: Sep. 24, 1996

[54] SUBSTITUTE GROUND SURFACE MATERIAL, PREPARATION METHOD THEREFOR, AND GROUND TREATMENT METHOD

[76] Inventor: Charles R. Bearden, 100 Laurel Valley Dr., West Columbia, Tex. 77486

[21] Appl. No.: 183,050

[22] Filed: Jan. 18, 1994

[51] Int. Cl.$^6$ ............................ C09K 17/00; A63K 1/00; C08K 3/34

[52] U.S. Cl. .......................... 523/132; 524/445; 524/481; 524/484; 472/86; 472/87

[58] Field of Search .................................. 523/132, 131; 524/455, 481, 484; 472/86, 87

[56] References Cited

U.S. PATENT DOCUMENTS

| Re. 34,267 | 6/1993 | Dachtler et al. | 4.72/86 |
|---|---|---|---|
| 4,792,133 | 12/1988 | Hawkins et al. | 472/86 |
| 4,852,870 | 8/1989 | Hawkins et al. | 472/86 |
| 4,968,024 | 11/1990 | Hawkins et al. | 472/86 |

FOREIGN PATENT DOCUMENTS

| 0419170A3 | 3/1991 | European Pat. Off. | E01C 13/00 |
|---|---|---|---|
| 1477841 | 5/1989 | U.S.S.R. | 523/132 |
| 2251247 | 7/1992 | United Kingdom | 472/86 |

OTHER PUBLICATIONS

"Making Tracks Safer", Deirdre B. Biles, The Blood-Horse, May 17, 1986, pp. 3520–3523.
"The Race for Safety", Les Sellnow, The Blood-Horse, Mar. 25, 1989, pp. 1704–1708.
"The Verdict on Equitrack", Les Sellow, The Blood-Horse, Jan. 5, 1991, pp. 54–58.

Primary Examiner—Paul R. Michl
Assistant Examiner—LaVonda R. Dewitt
Attorney, Agent, or Firm—J. M. Gilbreth

[57] ABSTRACT

Disclosed is a substitute ground surface material comprising a granular component comprising sand and at least one of clay or silt, wherein the granular component is treated with a binder comprising an interpolymer dissolved or dispersed in a non or low aromatic oil and wherein the binder is generally fluid at the treating conditions. In a process for treating existing dirt tracks or existing synthetic tracks, an aqueous emulsion of the interpolymer/oil bind is sprayed on the existing dirt track to form the substitute ground surface in-situ.

18 Claims, No Drawings

SUBSTITUTE GROUND SURFACE MATERIAL, PREPARATION METHOD THEREFOR, AND GROUND TREATMENT METHOD

BACKGROUND OF THE INVENTION

1. Field of the Invention

The present invention relates to a substitute ground material and to a process for making such material, and to a ground treatment method. In another aspect, the present invention relates to a substitute ground material comprising sand, clay or silt and a polymer/oil binder, to a process for making such a substitute ground surface material, and to a method of treating an existing dirt track. In yet another aspect, the present invention relates to a substitute ground material comprising sand, clay or silt and an interpolymer/oil binder, to a process for making such a substitute ground surface material, and to a method of treating an existing dirt track by applying an aqueous emulsion of an interpolymer/oil binder to the dirt track.

2. Description of the Related Art

Dirt tracks utilized in horse racing generally comprise a mixture of sand, clay and silt and generally include a top layer "cushion" that overlays "pad" that are both supported on a suitable "substrate" or "base".

The base is consolidated matter upon which the pad and the cushion are layered. The pad is generally a layer of dirt on the order of about four to about twelve inches thick, that is laid upon the base and compacted to a bulk density of about 1.7. The cushion is generally on the order of about three inches thick and comprises loose, fluffy rakable material with a bulk density of about 1, and may be laid upon the pad, or cut from the pad by raking. In the care and maintenance of the dirt racetrack, the cushion is generally "worked" with a harrow, while the pad remains compacted and is occasionally disturbed.

Ideally, the dirt track must provide proper shock absorbency and adequate traction for the running of a safe race.

It has been suggested in the prior art that proper dirt track maintenance requires a good harrowing program to break up the cushion dirt compacted by horse's hooves and to maintain uniformity in the cushion's density and depth. Such a program requires proper harrowing equipment and proper frequency of harrowing.

It has been further suggested in the prior art that proper dirt track maintenance requires a proper moisture control program. Unfortunately, dirt tracks are very moisture sensitive and generally require a moisture content of about 7 to about 11 weight percent in the cushion for suitable track conditions. At a low moisture content, a dirt track tends to become dry and will, especially in a turn, tend to fall away from the horse's hooves. At a high moisture content, generally above 14 weight percent, the track tends to become "sloppy" at which point the watery track tends to squirt out from under the horse's hoof, giving the horse little or no support.

While it is understood that a dirt track requires seven to eleven weight percent moisture content, it is generally very difficult to keep the track within the desired operating range. Unfortunately, the ordinary water truck tends to increase moisture content by 0.3 percent per pass. Thus, on a very hot, dry day, where more than 0.3 percent water is being lost between passes of the water truck, a situation is encountered in which the water truck cannot keep up with evaporative losses.

Additionally, uniformity of the moisture content across the surface of the dirt track is generally impossible to achieve. Because of variances in shade, wind currents and other factors, evaporation rates can be dramatically different from place to place across the track.

In an effort to improve horse racetracks and overcome some of the deficiencies of dirt tracks, there have been alternative racetrack surfaces disclosed in the prior art which generally do not require constant watering to maintain a suitable moisture content.

For example, U.S. Pat. No. 4,792,133, issued Dec. 20, 1988 to Hawkins et al., discloses a substitute ground surface material suitable for use as the rakable "cushion" portion of a horse or dog race track. As disclosed, the substitute ground surface material comprises about 94 percent sand or a like material which is added to a polymeric binder comprising 10 percent polymeric material, such as ethylene vinyl acetate, polystyrene, nylon, polypropylene or polyvinyl chloride, dissolved in an oil that is generally a non-free flowing grease at normal track operating conditions. Typically, about six to about eight inches of the resulting coated substitute ground surface material, is then laid as a permanently rakeable cushion over a subsoil or suitable porous graded base. The surface of this cushion is maintained by raking or turning over the top two or three inches of the cushion.

U.S. Pat. No. 4,852,870, issued Aug. 1, 1989 to Hawkins et al., also discloses a substitute ground surface material suitable for use as the rakable "cushion" portion of a horse or dog race track. As disclosed, the substitute ground surface material comprises about 94 percent sand or a like material which is added to a binder comprising 10 percent styrene-butadiene-styrene copolymer dissolved in an oil that is generally non-free flowing grease at normal track operating conditions. Other disclosed polymers include polypropylene. The resulting coated substitute ground surface material, which is permanently capable of being raked, is then laid as a cushion layer over a subsoil or suitable porous graded base, with the the top of the cushion maintained by raking.

U.S. Pat. No. 4,968,024, issued Nov. 6, 1990 to Hawkins, discloses a substitute ground surface material suitable for use as the rakable "cushion" portion of a horse or dog race track. As disclosed, the substitute ground surface material comprises 98 percent sand or a like material which is added to binder comprising 20 to 40 percent styrene-butadiene-styrene copolymer dissolved in an aromatic oil that is generally free-flowing at normal track operating conditions. The resulting coated substitute ground surface material, which is permanently capable of being raked, is then laid as a cushion layer over a subsoil or suitable porous graded base, with the surface maintained by raking and light rolling.

EP 0 419 170 A3 published Mar. 27, 1991 discloses a substitute ground surface material suitable for use as the rakable "cushion" portion of a horse or dog race track. As disclosed, the substitute ground surface material comprises from 93.5 to 98 weight percent sand or a like material which is added to binder comprising 10 to 60 weight percent styrene-butadiene-styrene copolymer dissolved in an aromatic oil that is generally free-flowing at normal track operating conditions. The resulting coated substitute ground surface material, which is permanently capable of being raked, is then laid as a cushion layer over a subsoil or suitable porous graded base, with the top of the cushion maintained by raking.

The above references all disclose that the substitute material is laid upon the base as a six to eight inch permanently rakeable cushion layer, as opposed to the traditional method of forming a compacted pad layer upon the base and cutting a cushion from the compacted pad. In the actual use of the above substitute materials, the pad layer is generally formed by horses' hooves. Unfortunately, a pad formed from such a permanently rakable material will give a soft or mushy layer which is more suitable for use as a training track, i.e. such as the "trots" in England. Such an alternative surface is not suitable for use in American racetracks which generally require a harder compacted pad layer.

Additionally, the prior art alternative racetrack surfaces require the fabrication of a pad and/or cushion which is then laid upon a base. With existing dirt racetracks, this means that the existing cushion and any pad must first be removed from the base, and then the new pad fabricated and then laid upon the base. However, as there are numerous dirt tracks in existence, there is a need in the art for a method of treating existing dirt racetracks without having to remove the existing cushion and pad.

SUMMARY OF THE INVENTION

According to one embodiment of the present invention there is provided a substitute ground surface material comprising a granular component comprising sand and at least one of clay or silt, wherein the granular component is treated with a binder comprising an interpolymer dissolved or dispersed in a non or low aromatic oil, wherein the oil is generally fluid at the granular component treating temperatures.

The substitute ground surface material of the present invention will generally comprise an amount of binder and granular component to provide proper surface conditions for the desired end use. Generally, finer granular particle size will necessitate more binder. Generally, the substitute ground surface material of this embodiment will comprise in the range of about 2 to about 10 weight percent binder and in the range of about 90 to about 98 weight percent granular component. The binder generally comprises in the range of about 2 to about 10 weight percent interpolymer. The interpolymers are generally amorphous polymers that are soluble or dispersable in a non-aromatic or low-aromatic oil. Examples of suitable polymers include poly alpha-olefin interpolymers derived from ethylene, propylene, butene and higher order alpha-olefins, and interpolymers of ethylene and or propylene with ethylenically unsaturated monomers, including vinyl acetate, methyl acrylate, ethyl acrylate and the like.

Oils suitable for use in the present invention must generally be resistant to rapid degradation or oxidation from heat or U.V. light, contain low or no aromatic fractions, have a flash point generally suitable to maintain the oil on the track after application, and must generally allow the binder to be fluid at the granular treating temperature. Examples of oils suitable for use in the present invention include paraffinic oils and low-aromatic naphthenic oils.

According to another embodiment of the present invention there is provided a process for making a substitute ground surface material comprising contacting a granular material comprising sand and at least one of clay or silt, with a binder comprising an interpolymer dissolved or dispersed in a non or low aromatic oil, wherein the binder is generally fluid at the contacting temperatures.

According to still another embodiment of the present invention there is provided a process for treating an existing dirt track comprising sand and at least one of clay or silt, the method comprises contacting the dirt track with an aqueous emulsion of a binder comprising an interpolymer dissolved or dispersed in a non or low aromatic oil, wherein the oil is generally fluid at the contacting temperatures.

DETAILED DESCRIPTION OF THE INVENTION

The substitute ground surface material of the present invention generally comprises a granular portion and a binder portion. The substitute ground surface material generally comprises in the range of about 2 to about 10 weight percent binder and in the range of about 90 to about 98 weight percent granular material. Preferably, the substitute ground surface material generally comprises in the range of about 3 to about 9 weight percent binder and in the range of about 91 to about 97 weight percent granular material. More preferably, the substitute ground surface material generally comprises in the range of about 4 to about 8 weight percent binder and in the range of about 92 to about 96 weight percent granular material, and most preferably, in the range of about 7 to about 8 weight percent binder and in the range of about 92 to about 93 weight percent granular material.

In the practice of the present invention, the granular portion will generally comprise sand and at least one selected from the group of materials consisting of clay or silt. Preferably, there is little or no gravel in the material of the present invention. Most preferably, the granular portion utilized in the present invention will comprise sand, clay and silt.

Generally, the percentage composition of the clay, sand and silt utilized will be dictated by the type of material naturally available. It is generally only necessary that the clay or silt will be present in an amount suitable to maintain cohesion in the substitute ground surface material of the present invention. It is believed by the inventor that almost all naturally occuring mixtures of clay, sand and silt will provide the proper cohesion and can be utilized.

When both silt and clay are present, the ratio of silt to clay is in the range of about 1:3 to about 3:1, preferably in the range of about 1:2 to about 2:1, and most preferably about 1:1.

For most applications, the granular portion utilized will fall with in the range of about 10 to about 30 weight percent clay or silt. Preferably, the granular portion comprises in the range of about 10 to about 25 weight percent clay or silt, and most preferably in the range of about 12 to about 22 weight percent clay or silt. The clay or silt utilized in the present invention will generally comprise particles with diameters in the range of about 0.05 to about 0.002 millimeters.

The granular portion of the substitute ground surface material of the present invention will generally comprise in the range of about 70 to about 90 weight percent sand having an average diameter in the range of about 0.05 to about 1 millimeters. In a preferred embodiment of the present invention, the granular portion will comprise in the range of about 30 to about 40 weight percent course sand having an average diameter in the range of about 0.5 to about 1 millimeters, and further comprise in the range of about 40 to about 50 weight percent fine sand having an average diameter in the range of about 0.05 to about 0.5 millimeters.

The binder portion of the substitute ground surface material of the present invention will generally comprise an amorphous polymer dissolved or dispersed in a non-aromatic or low-aromatic oil. The binder utilized in the present invention will generally comprise in the range of about 2 to about 10 weight percent interpolymer. Preferably, the binder will comprise in the range of about 4 to about 8 weight percent interpolymer.

Polymers suitable for use in the binder portion of the substitute ground surface material of the present invention are essentially amorphous polymers that are soluble or disperable in a non-aromatic or low-aromatic oil.

Polymers suitable for use in the present invention include poly alpha-olefin interpolymers derived from ethylene, propylene, butene and higher order alpha-olefins. Commercially available examples of suitable poly alpha-olefin interpolymers include Vestoplast 608 or 708 from Huls.

Other polymers suitable for use in the present invention include interpolymers of ethylene and or propylene with ethylenically unsaturated monomers, including vinyl acetate, methyl acrylate, ethyl acrylate and the like.

Oils suitable for use in the present invention must generally be resistant to rapid degradation or oxidation from heat or U.V. light. Suitable oils contain low or no aromatic fractions, have a flash point generally suitable to maintain the oil on the track after application, and are generally fluid at granular contacting temperatures. While oils with lower flash points can possibly be utilized, the oil of the present invention will generally have a flash point above about 350° F. Examples of oils suitable for use in the present invention include paraffinic oils and low-aromatic naphthenic oils. A commercially available example of a paraffinic oil includes Exxon's 150 SE solvent extracted bright stock FN-2507, and of a low-aromatic naphthenic oil includes Cyclolube No. 2290 available from Witco.

The binder of the present invention may be contacted with the granular material in "neat" form, i.e. oil and polymer, or may be contacted with the granular material in an aqueous emulsion.

When the binder of the present invention is prepared as an emulsion and contacted with the granular soil to create the substitute ground surface material of the present invention, the emulsion generally comprises water and binder present in a ratio in the range of about 10:1 to about 1:10. Preferably, the ratio of water to binder in the emulsion is in the range of about 5:1 to about 1:5, and most preferably in the range of about 3:1 to about 1:3.

The emulsion further comprises an emulsifying agent present in an amount suitable to form an emulsion of the binder and water. Suitable emulsifying agents include ionic surfactants, non-ionic surfactants, and mixtures thereof, comprising in the range of about 0.01 to about 10 weight percent of the emulsion. Preferably, the emulsifying agent will comprise in the range of about 0.1 to about 2 weight percent of the emulsion and most preferably in the range of about 0.5 to about 1.5 weight percent.

Emulsion preparation is well known to those of skill in the art and generally includes contacting the binder, water and emulsifier under conditions suitable to form an emulsion. Some stirring or shaking is generally necessary to form the emulsion.

In the practice of the present invention, the prepared emulsion is generally applied to an existing dirt racetrack to form a new surface in-situ. As the emulsion has viscosity approximating that of water, it will percolate into the cushion thereby coating the particles evenly. As the water evaporates, a thin uniform binder layer is left on the particles.

The emulsion of the present invention may be applied to a racetrack surface by any suitable means. The binder is generally applied as part of an emulsion or if applied neat, under temperature conditions suitable to liquify the binder. Such suitable means for applying the neat binder or binder emulsion include spraying, pouring, sprinkling, etc. The emulsion can also be worked into the track utilizing the traditional track working equipment. Preferably, the prepared emulsion is applied to the track via an oil spray truck.

It is also understood the the binder composition of the present invention may also be applied to the granular material away from the track, with the coated granular particles subsequently laid upon the track.

The binder of the present invention may be applied to the granular material either in neat form or as an aqueous solution, or with any other suitable carrier material or liquid. Preferably in the practice of the present invention, the first application of the binder is as an aqueous emulsion.

While the binder of the present invention may be used to create new track material, it may also be used to recondition old, used or weathered synthetic track surfaces that are considered "dead" for cohesion purposes. The binder material may be directly applied to the "dead" material either neat or as an emulsion. Optionally, fresh dirt may first be added to the dead material. When fresh dirt is added, the weight ratio of fresh dirt to dead material dirt is in the range of about 0.01:1 to about 4:1. Preferably, the weight ratio of fresh dirt to dead material dirt is in the range of about 0.35:1 to about 1:1.

EXAMPLES

Example 1

Binder Preparation

The binder preparation for three samples A, B, and C was as follows.

Sample A: Five parts of Huls Vestoplast 708 polymer was dispersed in 95 parts of Witco Cyclolube 2290. While stirring, the temperature of the mixture was raised to 265° F. After approximately 30 minutes of stirring the polymer had dissolved. Subsequently, the resulting product was cooled to room temperature.

Sample B: Six parts of Huls Vestoplast 708 was added to 94 parts of Exxon bright stock oil. While stirring, the temperature of the mixture was raised to 265° F. After approximately 30 minutes of stirring the polymer had dissolved in the oil and was subsequently cooled.

Sample C: Five parts of Du Pont's ethylene vinyl acetate copolymer #250 (ethylene vinyl acetate has 25% vinyl acetate content and is a medium mole weight copolymer) was dissolved as above in Exxon bright stock and cooled.

Emulsion Preparation

Emulsions of Samples A, B and C above were prepared as follows.

To 66 g of water in a jar was added 0.3 g of a surfactant comprising a mixture of anionic and non-ionic surfactants.

33 g of binder Sample A was added to the jar and a screw cap affixed. Mixture was shaken and the emulsion formed. Process was repeated for binder Samples B and C. Emulsions were stable #or a short but adequate time. As the $H_2O$ and oil began to separate, slight agitation caused complete re-emulsification. In commercial practice, a re-circulation pump would be used to keep the emulsion homogenized.

Emulsions were also prepared at 50:50 oil/$H_2O$.

Binder Application to Dirt

In the laboratory: To 50 g of the sand/clay/silt (SCS) mixture was added 3.5 g of a 50:50 emulsion of Sample A and mixed thoroughly. After evaporation of the water a second addition of 3.5 g of the emulsion was made. Again product was mixed and dried. The composite now contains 7% by weight binder (0.35% polymer) encapsulating the particulates. Composites using binder Samples B and C were also made in this manner.

Insitu on Track

This process has been done on a track using an oil and water emulsion. The 14 foot wide spray bar of an asphalt/oil spray truck does an excellent job.

Test Using Sand Only

A washed mason sand which is a fine grain sand was treated as above. This sand, typically used in "all weather" synthetic tracks, contains little or no clay or silt was tested (results below) to show difference between sand only and sand/clay/silt above.

Test Using Aged "All Weather" Composite

The binder of the present invention was applied to a weathered prior art all weather track of the type disclosed in U.S. Pat. No. 4,792,133. In this test, the '133 patent product oxidized via UV exposure after 18 months service in Oklahoma to the point all cohesion was gone.

In a unique application of this invention, this "dead" weathered material was treated with the binder of the present invention. First, one part by weight fresh track dirt was added to every two parts by weight of the "dead" weathered dirt. Next, binder Sample B was added via emulsion at a 3.5% binder level to this "dead" weathered material. The dead track was rejuvenated and had excellent cohesion. A track so treated could be returned to service for many years.

Tests and Results Regarding Composites

The samples were all tested for cohesion—that property of the cushion needed to give good footing and shock absorbing properties. Cohesiveness or lack of same is obvious by just pressing material between forefinger and thumb. Cohesion is present when material compacts to form a shape versus loose particles.

A test was used to obtain a value number, utilizing a modified soil penetrometer. Here a sample was placed in a one inch ID PVC pipe coupling. The sample material was compacted with a rod slightly smaller than ID of the coupling at 26 psi. The penetrometer probe with a ¼" head was forced into compacted sample while on a load scale. The maximum force in PSI required to penetrate the sample was determined, with higher values indicating a more cohesive product. For a cushion, values less than about 30 psi are considered fair, values greater than about 30 and less than about 40 are considered good, values above 40 and less than 60 are considered very good, and values above 60 to about 100 are considered excellent. Pad material should be on the high end for suitable pad forming qualities.

Water Resistance

Material has excellent H$_2$O resistance if:

(1) it sheds water sprayed on its surface;
(2) upon saturation with H$_2$O, i.e., 15% or more H$_2$O "worked" into material, it retains a measure of cohesiveness versus going sloppy.

U.V. Tests Re Water Resistance

Accelerated U.V. exposure consisted of two high intensity U.V. bulbs. Standard formulations with real time outdoor exposure were used to compare with experimental samples. These standards were derived by exposure time in Arizona and by on-track exposure in Oklahoma.

For example, one day on the test apparatus=1.3–1.5 months on a track in Oklahoma.

The following Tables 1 and 2 show data for the above tests for binder samples A, B and C from above.

TABLE 1

Dirt With Binder

| TESTS | BINDER A | BINDER B | BINDER C |
|---|---|---|---|
| Cohesion Test Pinch | excellent | excellent | good |
| Cohesion Test Petrometer | 80 psi | 72 psi | 40 psi |
| H$_2$O Resistance Spray | excellent | excellent | — |
| H$_2$O Resistance Saturated | excellent | very good | — |
| Track Service Life - UV Test | >6 years | >11 years | — |

| | COMPARITIVE RESULTS | |
|---|---|---|
| TESTS | PRODUCT OF 133 PATENT | PRODUCT OF 870 PATENT |
| Cohesion Test Pinch | good | good |
| Cohesion Test Petrometer | — | — |
| H$_2$O Resistance Spray | excellent | excellent |
| H$_2$O Resistance Saturated | excellent | excellent |
| Track Service Life - UV Test | <1.5 years | <1.5 years |

TABLE 2

BINDER B WITH SAND & "DEAD" TRACK

| TESTS | SAND | DEAD TRACK |
|---|---|---|
| Cohesion Test Pinch | poor | excellent |
| Cohesion Test Petrometer | >15 psi | 100 psi |
| H$_2$O Resistance Spray | — | excellent |
| H$_2$O Resistance Saturated | — | excellent |
| Track Service Life - UV Test | — | >3 years (test stopped before failure) |

Example 2—Neat Binder Vs. Emulsion

This example compares the ease of application to dirt of neat binder versus an aqueous emulsion of the binder. The binder prepared as sample B above was utilized in this example. The emulsion comprised a 50/50 mixture of water and binder.

50 g samples of dirt from an existing commercial horse race track. The levels of binder:dirt utilized were 3% for the neat binder, and 6% for the emulsion.

Dry Dirt—Neat Binder

Neat binder B at 160° F. was contacted with a dry dirt sample. It was observed that upon the initial application of binder agglomerations were formed, and that the "wetting" of the particles was incomplete. The second application of binder was somewhat less difficult but good dispersion was still not achieved.

Moist Dirt—Neat Binder

Neat binder B at 160° F. was contacted with a moist dirt sample. For the initial application, it was observed that while the dispersal was difficult, it was eventually obtained. The second addition of binder dispersed much easier. The moisture in the dirt appeared to noticeably reduce the tendency of the dirt to agglomerate.

Dry or Moist Dirt—Emulsion Followed By Neat Binder

An aqueous emulsion of Binder B at room temperature was first applied to both dry dirt and moist dirt with excellent dispersion achieved coating all particles with only modest mixing required. After the water from the emulsion was allowed to evaporate, neat binder was applied. With only modest mixing the binder quickly dispersed coating the particles evenly.

The description given herein is intended to illustrate the preferred embodiments of the present invention. It is possible for one of ordinary skill in the art to make various changes to the details of the present invention, without departing from the spirit of this invention. Therefore, it is intended that all such variations be included within the scope of the present invention as claimed.

Additionally, while the present invention has been illustrated with particular reference to horse racetracks, it is understood that the present invention also has application to any other type of track or surface for which soil stabilization would be useful. Such other uses include dog race tracks and athletic fields, and can also include staging, loading or landing areas for moving cargo or personnel, such as in military uses. Other uses include soil stabilization of play grounds, rodeo grounds, fair grounds and the like.

I claim:

1. A process for treating an existing dirt surface comprising sand and at least one of clay or silt, the method comprises contacting the dirt surface in situ with a binder comprising an interpolymer and a non or low aromatic oil, wherein the binder is fluid during the contacting.

2. The process of claim 1 wherein the binder comprises in the range of about 2 to about 10 weight percent interpolymer and in the range of about 90 to about 98 weight percent oil.

3. The process of claim 1 wherein the interpolymer is selected from poly alpha-olefin polymers and interpolymers of ethylene or propylene with an ethylenically unsaturated monomer.

4. A process for treating an existing dirt surface comprising sand and at least one of clay or silt, the method comprises contacting the dirt surface with a binder comprising an interpolymer and a non or low aromatic oil, wherein the binder is fluid during the contacting, and wherein the binder is emulsified in an aqueous emulsion.

5. The process of claim 4 wherein the emulsion comprises water and binder in a ratio in the range of about 10:1 to about 1:10.

6. The process of claim 1 wherein the binder comprises in the range of about 4 to about 8 weight percent interpolymer and in the range of about 92 to about 96 weight percent oil, and wherein the interpolymer is selected from poly alpha-olefin polymers and interpolymers of ethylene or propylene with an ethylenically unsaturated monomer.

7. The process of claim 1 wherein the interpolymer comprises a poly alpha-olefin interpolymer.

8. Substitute ground surface material comprising a granular component comprising sand and clay or silt existing on the ground, wherein the granular component is treated in situ with a binder comprising an interpolymer and a non or low aromatic oil.

9. The material of claim 8 wherein the interpolymer is dissolved or dispersed in the oil.

10. The material of claim 8 wherein the granular component comprises sand, clay and silt.

11. The material of claim 8 wherein the material comprises in the range of about 2 to about 10 weight percent binder and in the range of about 90 to about 98 weight percent granular component.

12. The material of claim 8 wherein the interpolymer is selected from poly alpha-olefin polymers and interpolymers of ethylene or propylene with an ethylenically unsaturated monomer.

13. The material of claim 8 wherein the binder comprises in the range of about 2 to about 10 weight percent interpolymer and in the range of about 90 to about 98 weight percent oil.

14. Substitute ground surface material comprising a granular component comprising sand and clay or silt, wherein the granular component is treated with a binder comprising an interpolymer and a non or low aromatic oil, and wherein the material comprises in the range of about 2 to about 10 weight percent binder and in the range of about 90 to about 98 weight percent granular component, the granular component comprises sand, silt and clay, the interpolymer is selected from poly alpha-olefin polymers and interpolymers of ethylene or propylene with an ethylenically unsaturated monomer, and the binder comprises in the range of about 4 to about 8 weight percent interpolymer and in the range of about 92 to about 96 weight percent oil.

15. The material of claim 8 wherein the interpolymer comprises a poly alpha-olefin interpolymer.

16. A process for making a substitute ground surface material comprising contacting a granular material comprising sand and at least one of clay or silt, with a binder comprising an interpolymer and a non or low aromatic oil, wherein the binder is fluid during contacting, and wherein the binder is emulsified in an aqueous emulsion.

17. The process of claim 16 wherein the emulsion comprises water and binder in a ratio in the range of about 10:1 to about 1:10.

18. A process for treating a synthetic ground surface material that is currently installed on the ground, comprising contacting the surface with a binder comprising an interpolymer and a non or low aromatic oil, wherein the binder is fluid during the contacting, and wherein the contacting takes place in situ.

\* \* \* \* \*